UNITED STATES PATENT OFFICE.

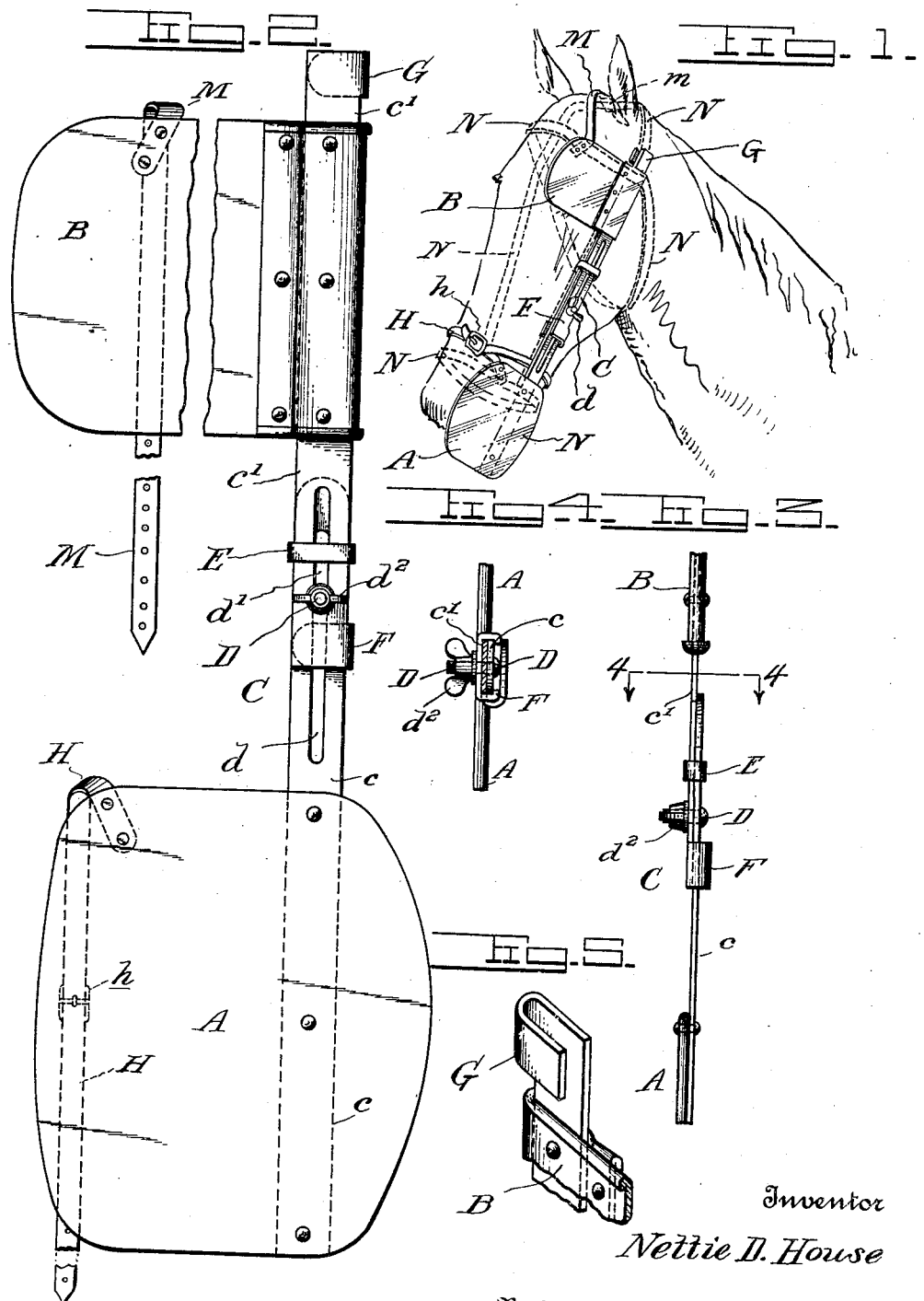

NETTIE D. HOUSE, OF MODALE, IOWA.

CORN-SHIELD FOR HORSES' HEADS.

1,321,448.  Specification of Letters Patent.  Patented Nov. 11, 1919.

Application filed June 24, 1919. Serial No. 306,327.

*To all whom it may concern:*

Be it known that I, NETTIE D. HOUSE, a citizen of the United States, residing at Modale, in the county of Harrison and State of Iowa, have invented certain new and useful Improvements in Corn-Shields for Horses' Heads, of which the following is a specification.

The object of this invention is to prevent a horse or other draft animal from eating corn while drawing a wagon accompanying those engaged in husking the corn. Ordinarily when the wagon is drawn close to a row of corn the horse will eat from the row before it is husked, and there has been much loss on this account.

According to my invention I provide shields for one side of the head of the horse which covers one of the eyes and one side of the nose and mouth, so that as the wagon is drawn along beside the row while being husked the horse cannot see the corn and that side of his mouth next the corn is covered or shielded so as to prevent his eating or interfering with the corn while being husked.

My improvements are illustrated in the accompanying drawings, in which—

Figure 1 is a perspective view illustrating how my improved shield is applied to the head of a horse.

Fig. 2 is a side elevation of the combination shield.

Fig. 3 is an edge view of the frame connecting the two shields.

Fig. 4 shows a transverse section on the line 4—4 of Fig. 3.

Fig. 5 is a perspective view of a hook or catch with which the shield is equipped.

The shield as a whole comprises two parts or members, A and B, connected by an adjustable frame C. The members A and B are preferably made of sheet metal, and the frame members C are also made of metal, such as strap iron. The shield member A is riveted to one member $c$ of the frame and the other shield member B is riveted to the other member $c'$ thereof. The two frame members are adjustably connected so that the shield members A and B may be arranged the desired distance from each other to accommodate horses of different sizes or those having heads of different lengths.

The means for adjustably securing the frame members together comprises a set screw D which extends through slots $d$, $d'$ in the frame members and which is provided with a clamping nut $d^2$. E indicates a slip ring for holding the frame members in alinement. The frame member $c$ carries a catch or hook F which is adapted to engage the bridle N, in the manner indicated in Fig. 1. The upper frame member $c'$ carries a catch or hook G also adapted to engage the bridle. The lower shield member A is provided with a strap H, carrying a buckle $h$ and the upper member B carries a strap M.

Fig. 1 indicates how the device is applied to a bridle N of usual construction.

The device as a whole is applied to one side of the horse's head. After proper adjustment of the frame members has been made to correspond with the length of the horse's head the hook F is made to engage the lower part of the bridle on one side and the hook G is made to engage the same side of the bridle near its upper portion. The strap H is wound around the nose of the horse above the mouth and its end is secured in the buckle $h$.

The strap M projecting from the upper shield member B is connected in any suitable way, as by a buckle $m$, with the top of the bridle in rear of the ears.

The combination shield may be very quickly applied to the bridle and may be as quickly removed. When in place, as indicated in Fig. 1, one of the horse's eyes is blinded or shielded and one side of his mouth is covered so that when passing along a row of corn being husked, the horse cannot readily see the corn and cannot easily bite it. If he eats at all he will naturally eat what he sees with the other eye and this is after the corn has been husked and merely the shucks or husks remain. In fact by leaving one eye of the horse unblinded, and one side of the mouth free the horse will naturally eat the corn husks on one side rather than turn in another direction to find food. The shield leaves the mouth free both at front and on one side and one eye unblinded. The same result could not be obtained if both eyes were blinded and a muzzle inclosed the mouth.

As before stated, the frame members are preferably adjusted and held by the set screw previous to being placed on the horse's head, but a finer adjustment may be given after the shields are applied to the bridle.

Preferably the lower frame piece $c$ extends entirely across the lower shield member A, as indicated by dotted lines in Fig. 2 and is riveted to one side of the shield. The upper frame member preferably extends through a loop in the shield member B and projects above the top of such member where it is provided with a hook or catch G, but these details of construction are not essential.

I claim as my invention:—

1. A corn shield for one side of a horse's head, comprising two corn shield members one for the eye and the other for one side of the mouth, a frame connecting the shield members, and means for varying the length of the frame to hold the shield members varying distances apart.

2. A corn shield for one side of a horse's head, comprising upper and lower shield members one for the eye and the other for one side of the mouth, and a frame connecting the shield members consisting of two parts adjustably connected with each other to vary the distance of the shield members from each other.

3. A corn shield for one side of a horse's head, comprising two shield members one for the eye and the other for one side of the mouth, a frame connecting the shield members, means for adjusting the length of the frame to vary the distance of the shield members from each other, hooks carried by the frame for engaging the bridle of the horse, and straps carried by the shield members for securing the shield to the head.

4. A corn shield for one side of a horse's head, comprising two shield members, an adjustable frame connecting them, a strap carried by the shield for attaching it to the nose of the horse, and a strap for connecting the shield with the upper part of a bridle.

In testimony whereof, I have hereunto subscribed my name.

NETTIE D. HOUSE.

Copies of this patent may be obtained for five cents each, by addressing the "Commissioner of Patents, Washington, D. C."